(12) United States Patent
Hirooka

(10) Patent No.: US 6,978,600 B2
(45) Date of Patent: Dec. 27, 2005

(54) SECONDARY AIR SUPPLY SYSTEM AND SECONDARY AIR SUPPLY METHOD

(75) Inventor: Shigemasa Hirooka, Susono (JP)

(73) Assignee: Toyota Jidosha Kabushiki Kaisha, Tokyo (JP)

( * ) Notice: Subject to any disclaimer, the term of this patent is extended or adjusted under 35 U.S.C. 154(b) by 319 days.

(21) Appl. No.: 10/654,448

(22) Filed: Sep. 4, 2003

(65) Prior Publication Data

US 2004/0060282 A1   Apr. 1, 2004

(30) Foreign Application Priority Data

Oct. 1, 2002   (JP) ............................. 2002-288779

(51) Int. Cl.[7] .............................................. F01N 3/00
(52) U.S. Cl. ............................ 60/289; 60/274; 60/285
(58) Field of Search .......................... 60/274, 285, 286, 60/289, 290

(56) References Cited

U.S. PATENT DOCUMENTS

| | | | | |
|---|---|---|---|---|
| 3,696,618 A | * | 10/1972 | Boyd et al. ................... | 60/289 |
| 3,896,616 A | * | 7/1975 | Keith et al. ................... | 60/274 |
| 4,099,377 A | * | 7/1978 | Yoshimura et al. ........... | 60/289 |
| 5,152,137 A | * | 10/1992 | Nishizawa ................... | 60/276 |
| 5,285,639 A | * | 2/1994 | Araki et al. ................... | 60/274 |
| 5,357,749 A | * | 10/1994 | Ohsuga et al. ................ | 60/274 |
| 5,379,586 A | * | 1/1995 | Honji et al. ................... | 60/276 |
| 5,551,231 A | * | 9/1996 | Tanaka et al. ................. | 60/289 |
| 5,560,199 A | * | 10/1996 | Agustin et al. ................ | 60/274 |
| 5,609,021 A | * | 3/1997 | Ma ............................... | 60/274 |
| 5,662,869 A | * | 9/1997 | Abe et al. ..................... | 422/171 |
| 6,029,441 A | * | 2/2000 | Mizuno et al. ................ | 60/276 |
| 6,637,189 B1 | * | 10/2003 | Boegner et al. ............... | 60/274 |

FOREIGN PATENT DOCUMENTS

| | | |
|---|---|---|
| DE | 41 28 429 C2 | 3/1992 |
| DE | 198 07 054 C2 | 8/1998 |
| JP | A 63-179119 | 7/1988 |
| JP | A 8-128320 | 5/1996 |
| JP | A 9-72235 | 3/1997 |

\* cited by examiner

Primary Examiner—Thomas Denion
Assistant Examiner—Diem Tran
(74) Attorney, Agent, or Firm—Oliff & Berridge PLC

(57) ABSTRACT

A secondary air supply system includes an exhaust gas control catalyst which is provided in an exhaust system in an internal combustion engine, and which purifies a harmful component in exhaust gas; a secondary air supply device which supplies secondary air into the exhaust gas upstream of the exhaust gas control catalyst; a secondary air supply stop device which stops the secondary air supply performed by the secondary air supply device; a fuel supply device which supplies fuel to the internal combustion engine; a fuel amount increasing device which increases a fuel amount supplied to the internal combustion engine during the secondary air supply; and a fuel amount increase stop time delaying device which delays, by a predetermined delay period, a stop time at which the increase in the fuel amount caused by the fuel amount increasing device is stopped even when the secondary air supply is stopped.

11 Claims, 7 Drawing Sheets

SECONDARY AIR SUPPLY SYSTEM AND SECONDARY AIR SUPPLY METHOD

INCORPORATION BY REFERENCE

The disclosure of Japanese Patent Application No. 2002-288779 filed on Oct. 1, 2002, including the specification, drawings and abstract is incorporated herein by reference in its entirety.

BACKGROUND OF THE INVENTION

1. Field of the Invention

The invention relates to a secondary air supply system which supplies air into exhaust gas in an internal combustion engine, and a secondary air supply method of the same.

2. Description of the Related Art

There is a conventional internal combustion engine including a secondary air supply mechanism which supplies secondary air to an exhaust gas control catalyst using an electric air pump, as disclosed in Japanese Patent Laid-Open Publication No. 8-128320.

Also, there is a technology in which control of an air-fuel ratio is performed considering an amount of adsorption material in a catalyst, as disclosed in Japanese Patent Laid-Open Publication No. 9-72235. In addition, there is a technology in which a delay in control of secondary air is corrected, as disclosed in Japanese Patent Laid-Open Publication No. 63-179119.

The exhaust gas control catalyst is in an excessive oxygen state, i.e., in a state where an amount of oxygen is excessive, immediately after the secondary air supply mechanism is stopped. Therefore, if a vehicle is accelerated thereafter, it becomes difficult for the catalyst to purify NOx. Also, immediately after the secondary air supply mechanism is started, for example, much time may be required to increase the rotational speed of an air pump, and a supply amount of the secondary air may become insufficient. Thus, when a fuel amount is increased at the time of the secondary air supply, oxygen may become insufficient, and accordingly the exhaust emission may deteriorate.

SUMMARY OF THE INVENTION

It is an object of the invention to provide a secondary air supply system which can suppress deterioration of exhaust emission due to temporary fluctuation of an air-fuel ratio immediately after the secondary air supply is started or immediately after the secondary air supply is stopped, and a secondary air supply method of the same.

A secondary air supply system according to a first aspect of the invention includes an exhaust gas control catalyst which is provided in an exhaust system in an internal combustion engine, and which purifies a harmful component in exhaust gas; a secondary air supply device which supplies secondary air into the exhaust gas upstream of the exhaust gas control catalyst; a secondary air supply stop device which stops the secondary air supply performed by the secondary air supply device; a fuel supply device which supplies fuel to the internal combustion engine; a fuel amount increasing device which increases a fuel amount supplied to the internal combustion engine when the secondary air supply device supplies the secondary air; and a fuel amount increase stop time delaying device which delays, by a predetermined period, a stop time at which the increase in the fuel amount caused by the fuel amount increasing device is stopped even when the secondary air supply is stopped by the secondary air supply stop device.

The most important characteristic of the invention is that the exhaust gas control catalyst is brought out of an excessive oxygen state by increasing the fuel amount even after the secondary air supply is stopped.

Immediately after the secondary air supply is stopped, the exhaust gas control catalyst is in the excessive oxygen state, and it is difficult for the catalyst to purify NOx. Meanwhile, when the secondary air is supplied, a fuel injection amount is increased and the increased amount of fuel reacts with the secondary air, whereby a temperature of the exhaust gas control catalyst is increased more effectively. The fuel amount increase stop time delaying device performs control such that the fuel amount is increased for the predetermined period even after the secondary air supply is stopped. The predetermined period needs to be a period sufficient for bringing the exhaust gas control catalyst out of the excessive oxygen state. Thus, an excessive amount of fuel is supplied, which makes it possible to bring the exhaust gas control catalyst out of the excessive oxygen state immediately after the secondary air supply is stopped.

According to a second aspect of the invention, the secondary air supply system according to the first aspect of the invention further includes a fuel amount increase start time delaying device which prohibits the increase in the fuel amount caused by the fuel amount increasing device during a period from when an operation of the secondary air supply device is started until when it becomes possible to supply a predetermined amount of the secondary air. Certain time is required for the secondary air supply device to actually start the secondary air supply, and to become able to supply a predetermined amount of the secondary air after the operation of the secondary air supply device is started. Therefore, the fuel amount increase start time delaying device prohibits the increase in the fuel amount during the period from when the operation of the secondary air supply device is started until when the secondary air is actually supplied. Thus, it is possible to suppress excessive supply of the fuel immediately after the secondary air supply is started.

According to a third aspect of the invention, the secondary air supply system according to the first aspect of the invention further includes a secondary air supply period calculating device which calculates a secondary air supply period during which the secondary air is supplied. As the period calculated by the secondary air supply period calculating device is longer, the fuel amount increase stop time delaying device is delayed by a longer delay period, the stop time at which the increase in the fuel amount is stopped after the secondary air supply is stopped. When the secondary air is supplied, exhaust gas in an oxidizing atmosphere is supplied to the exhaust gas control catalyst. At this time, oxidizing components such as NOx and $O_2$ are adsorbed by the exhaust gas control catalyst, and the amount of adsorbed oxidizing components increases. Meanwhile, deoxidizing components that have been adsorbed by the exhaust gas control catalyst, such as HC and CO, are oxidized and the amount of adsorbed deoxidizing components decreases. The amount of the oxidizing components adsorbed by the exhaust gas control catalyst is correlated with the secondary air supply period. As the secondary air supply period is longer, the amount of the adsorbed oxidizing components is larger. Accordingly, as the secondary air supply period is longer, the stop time at which the increase in the fuel amount is stopped is delayed by a longer delay period, which makes it possible to supply the fuel amount according to the amount of the oxidizing components adsorbed by the exhaust gas control catalyst. There is a limit to the amount of the oxidizing components that can be adsorbed by the exhaust gas control catalyst. Therefore, when the secondary air supply period calculated by the secondary air supply period calculating device becomes longer than a given period, the amount of the oxidizing components adsorbed by the exhaust gas control catalyst does not increase any further. Accordingly, it is preferable that the delay period should not be longer than a predetermined period.

According to a fourth aspect of the invention, the secondary air supply system according to the first aspect of the invention further includes an intake air amount calculating device which calculates an intake air amount that is an amount of air inhaled into the internal combustion engine during the secondary air supply. As the intake air amount calculated by the intake air amount calculating device is larger, the fuel amount increase stop time delaying device can delay, by a longer delay period, the stop time at which the increase in the fuel amount is stopped after the secondary air supply is stopped. The amount of the oxidizing components adsorbed in the exhaust gas control catalyst is correlated with the amount of air inhaled into the internal combustion engine during the secondary air supply. As the amount of air inhaled into the internal combustion engine during the secondary air supply is larger, the amount of the adsorbed oxidizing components is larger. Accordingly, as the amount of air inhaled into the internal combustion engine during the secondary air supply is larger, the stop time at which the increase in the fuel amount is stopped is delayed by a longer delay period, which makes it possible to supply the fuel amount according to the amount of the oxidizing components adsorbed in the catalyst. There is a limit to the amount of the oxidizing components that can be adsorbed by the exhaust gas control catalyst. Therefore, when the intake air amount calculated by the intake air amount calculating device becomes larger than a given amount, the amount of the oxidizing components adsorbed by the exhaust gas control catalyst does not increase any further. Accordingly, it is preferable that the delay period should not be longer than a predetermined period.

According to a fifth aspect of the invention, the secondary air supply system according to the first aspect of the invention further includes a catalyst temperature detecting device which detects a temperature of the exhaust gas control catalyst. As a temperature increase amount by which the temperature of the exhaust gas control catalyst is increased is larger, the fuel amount increase stop time delaying device can delay, by a longer delay period, the stop time at which the increase in the fuel amount is stopped after the secondary air supply is stopped. As the amount of the secondary air supplied to the exhaust gas control catalyst is larger, the amount of the oxidizing components adsorbed by the exhaust gas control catalyst is larger, and the temperature increase amount by which the temperature of the exhaust gas control catalyst is increased is larger. Accordingly, the amount of the oxidizing components adsorbed by the exhaust gas control catalyst is correlated with the temperature of the exhaust gas control catalyst. As the temperature increase amount by which the temperature of the exhaust gas control catalyst is increased is larger, the amount of the adsorbed oxidizing components is larger. Accordingly, as the temperature increase amount by which the temperature of the exhaust gas control catalyst is increased is larger, the stop time at which the increase in the fuel amount is stopped is delayed by a longer delay period, which makes it possible to supply the fuel amount according to the amount of the oxidizing components adsorbed by the catalyst. There is a limit to the amount of the oxidizing components that can be adsorbed by the exhaust gas control catalyst. Therefore, when the temperature of the exhaust gas control catalyst becomes higher than a given temperature, the amount of the oxidizing components adsorbed by the exhaust gas control catalyst does not increase any further. Accordingly, it is preferable that the delay period should not be longer than a predetermined period.

A secondary air supply system according to a sixth aspect of the invention includes an exhaust gas control catalyst which is provided in an exhaust system in an internal combustion engine, and which purifies a harmful component in exhaust gas; secondary air supply means for supplying secondary air into the exhaust gas upstream of the exhaust gas control catalyst; secondary air supply stop means for stopping the secondary air supply performed by the secondary air supply means; fuel supply means for supplying fuel to the internal combustion engine; fuel amount increasing means for increasing a fuel amount supplied to the internal combustion engine when the secondary air supply means supplies the secondary air; and fuel amount increase stop time delaying means for delaying, by a predetermined delay period, a stop time at which the increase in the fuel amount caused by the fuel amount increasing means is stopped even when the secondary air supply is stopped by the secondary air supply stop means.

Immediately after the secondary air supply is stopped, the exhaust gas control catalyst is in the excessive oxygen state, and it is difficult for the catalyst to purify NOx. Meanwhile, when the secondary air is supplied, a fuel injection amount is increased and the increased amount of fuel reacts with the secondary air, whereby a temperature of the exhaust gas control catalyst is increased more effectively. The fuel amount increase stop time delaying means performs control such that the fuel amount is increased for the predetermined period even after the secondary air supply is stopped. The predetermined period is a period sufficient for bringing the exhaust gas control catalyst out of the excessive oxygen state. Thus, an excessive amount of fuel is supplied, which makes it possible to bring the exhaust gas control catalyst out of the excessive oxygen state immediately after the secondary air supply is stopped.

A secondary air supply method according to a seventh aspect of the invention includes the steps of purifying a harmful component in exhaust gas using an exhaust gas control catalyst provided in an exhaust system of an internal combustion engine; supplying secondary air into the exhaust gas upstream of the exhaust gas control catalyst; stopping the secondary air supply; supplying fuel to the internal combustion engine; increasing a fuel amount supplied to the internal combustion engine when the secondary air is supplied; and delaying, by a predetermined delay period, a stop time at which the increase in the fuel amount is stopped even after the secondary air supply is stopped.

Immediately after the secondary air supply is stopped, the exhaust gas control catalyst is in the excessive oxygen state, and it is difficult for the catalyst to purify NOx. Meanwhile, when the secondary air is supplied, a fuel injection amount is increased and the increased amount of fuel reacts with the secondary air, whereby a temperature of the exhaust gas control catalyst is increased more effectively. In the step of delaying the stop time at which the increase in the fuel amount is stopped, the fuel amount is increased for the predetermined period even after the secondary air supply is stopped. The predetermined period is a period sufficient for bringing the exhaust gas control catalyst out of the excessive oxygen state. Thus, an excessive amount of fuel is supplied, which makes it possible to bring the exhaust gas control catalyst out of the excessive oxygen state immediately after the secondary air supply is stopped.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Hereinafter, preferred embodiments of a secondary air supply system according to the invention will be described with reference to the accompanying drawings. A case where the secondary air supply system according to the invention is applied to a gasoline engine for driving a vehicle will be described as an example.

Figure 1:
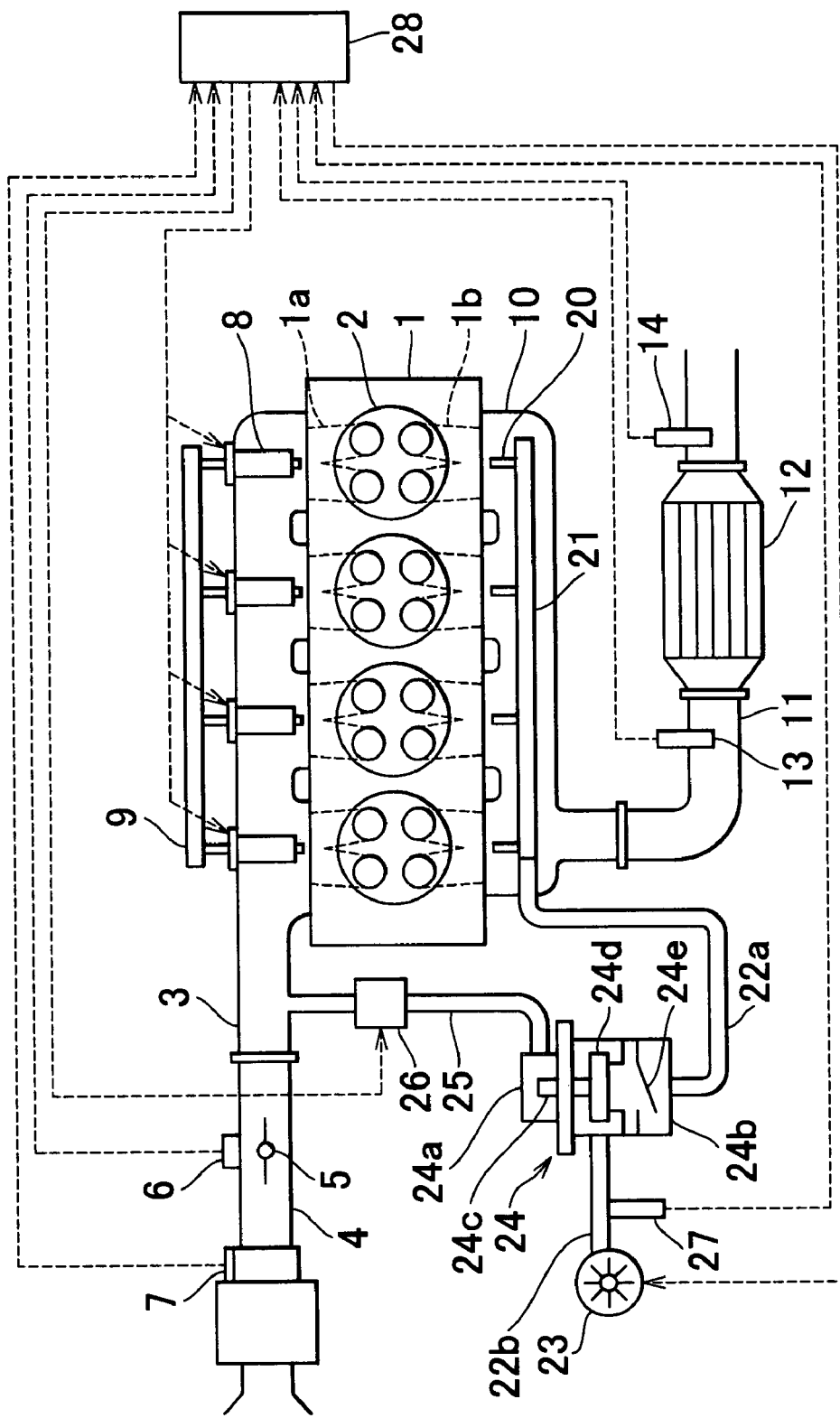
FIG. 1 is a diagram schematically showing configurations of an engine, intake and exhaust systems, and a secondary air supply mechanism.

FIG. 1 is a diagram schematically showing configurations of an engine, intake and exhaust systems, and a secondary air supply mechanism. In FIG. 1, an engine 1 is a water cooling type four-stroke gasoline engine having four cylinders 2.

An intake branch pipe 3 is connected to the engine 1. Air can flow between each branch pipe of the intake branch pipe 3 and a combustion chamber of each of the cylinders 2 via each intake port 1a.

The intake branch pipe 3 is connected to an intake pipe 4. A throttle valve 5 is provided at a position immediately upstream of the intake branch pipe 3 in the intake pipe 4. The throttle valve 5 adjusts a flow amount of intake air flowing in the intake pipe 4. A throttle sensor 6 is fitted to the throttle valve 5. The throttle sensor 6 outputs an electric signal according to a throttle opening. Based on the output signal from the throttle sensor 6, the opening of the throttle valve 5 can be determined. An air flow meter 7 is fitted at a position upstream of the throttle valve 5 in the intake pipe 4. The air flow meter 7 outputs an electric signal according to mass of intake air flowing in the intake pipe 4.

Also, fuel injection valves 8 are provided in the intake branch pipe 3. Each of the fuel injection valves 8 injects fuel into intake air flowing into each of the cylinders 2. Each of the fuel injection valves 8 is connected to a fuel distributing pipe 9 which distributes fuel.

In the intake system thus configured, intake air flows into the intake branch pipe 3 via the intake pipe 4. Intake air flowing into the intake branch pipe 3 is distributed to the combustion chamber of each of the cylinders 2 via each branch pipe of the intake branch pipe 3. At this time, driving current is applied to the fuel injection valve 8 such that the fuel injection valve 8 is opened. As a result, the fuel injection valve 8 injects fuel into the intake branch pipe 3 or the intake port 1a. The fuel injected into the intake branch pipe 3 is mixed with the intake air such that an air-fuel mixture is formed. The air-fuel mixture flows into each of the cylinders 2. In each of the cylinders 2, the air-fuel mixture is ignited by an ignition plug (not shown).

Meanwhile, an exhaust branch pipe 10 is connected to the engine 1. Air can flow between each branch pipe of the exhaust branch pipe 10 and the combustion chamber of each of the cylinders 2 via each exhaust port 1b. The exhaust branch pipe 10 is connected to an exhaust pipe 11. The exhaust pipe 11 is connected to a muffler (not shown) at a position in the downstream.

A three-way catalyst 12 is provided in the exhaust pipe 11. The three-way catalyst 12 can purify NOx by deoxidization in the deoxidizing atmosphere. Meanwhile, in the three-way catalyst 12, oxidation becomes active when the air-fuel ratio is lean, and HC and CO can be purified by oxidation. The three-way catalyst 12 functions most effectively when the air-fuel ratio is near a stoichiometric air-fuel ratio. An air-fuel ratio sensor 13 is fitted at a position upstream of the three-way catalyst 12 in the exhaust pipe 11. The air-fuel ratio sensor 13 outputs an electric signal according to the air-fuel ratio of the exhaust gas flowing in the exhaust pipe 11. Meanwhile, an oxygen concentration sensor 14 is fitted at a position downstream of the three-way catalyst 12 in the exhaust pipe 11. The oxygen concentration sensor 14 outputs an electric signal according to an oxygen concentration in the exhaust gas flowing in the exhaust pipe 11. The air-fuel ratio of the exhaust gas flowing into the three-way catalyst 12 can be feedback-controlled using the air-fuel ratio sensor 13. Also, it can be detected whether the exhaust gas emitted to the atmosphere has been actually purified by the three-way catalyst 12, using the oxygen concentration sensor 14.

In the exhaust system thus configured, the air-fuel mixture burned in each of the cylinders 2 of the engine 1 (i.e., burned gas) is discharged to the exhaust branch pipe 10 via the exhaust port 1b. Subsequently, the burned gas flows into the three-way catalyst 12 via the exhaust pipe 11. Then, after harmful gas components are purified, the burned gas is emitted to the atmosphere via the muffler.

The engine 1 includes a secondary air supply mechanism which supplies secondary air into the exhaust gas from each of the cylinders 2.

The secondary air supply mechanism includes secondary air injection valves 20 which inject secondary air into the exhaust gas flowing into the exhaust branch pipe 10 from the exhaust port 1b of each of the cylinders 2. Each of the secondary air injection valves 20 is connected to an air distributing pipe 21. An end of an air introducing pipe 22a is connected to the air distributing pipe 21, and the other end of the air introducing pipe 22a is connected to an outlet side of a secondary air chamber 24b included in an air switching valve (hereinafter, referred to as an ASV) 24. The ASV 24 is opened and closed by introducing a negative pressure therein from the intake branch pipe 3. The ASV 24 includes a negative pressure chamber 24a, the secondary air chamber 24b, a rod 24c, an opening/closing valve 24d, and a lead valve 24e. The negative pressure chamber 24a introduces a negative pressure therein from the intake branch pipe 3. In the secondary air chamber 24b, the secondary air flows. The rod 24c moves toward the negative pressure chamber 24a when the negative pressure is introduced in the negative pressure chamber 24a. The opening/closing valve 24d is opened and closed by moving the rod 24c. The lead valve 24e allows the air to flow only toward the secondary air injection valve 20 side from an air pump 23 side.

An end of the air introducing pipe 22b is connected to an inlet side of the secondary air chamber 24b. The other end of the air introducing pipe 22b is connected to the air pump 23. The air pump 23 is operated using an electric motor as a driving source. A pressure sensor 27 is fitted to the air introducing pipe 22b between the air pump 23 and the ASV 24. The pressure sensor 27 outputs an electric signal according to a pressure of the secondary air flowing in the air introducing pipe 22b.

Also, the negative pressure chamber 24a is connected to the intake branch pipe 3 via a negative pressure introducing pipe 25. A vacuum switching valve (hereinafter, referred to as a VSV) 26 is provided in the negative pressure introducing pipe 25. The VSV 26 is opened and closed when driving voltage is supplied thereto.

In the secondary air supply mechanism thus configured, when electric power is supplied to the air pump 23, the air pump 23 is rotated, and air is discharged according to the rotation. The air discharged from the air pump 23 increases the pressure inside the air introducing pipe 22b. Meanwhile, when the driving voltage is supplied to the VSV 26, the VSV 26 is opened, and the negative pressure is introduced to the negative pressure chamber 24a from the intake branch pipe 3. Due to the negative pressure introduced into the negative pressure chamber 24a, the rod 24c is attracted toward the negative pressure chamber 24a side. The opening/closing valve 24d connected to the rod 24c is opened, and provides communication between the air introducing pipe 22a and the air introducing pipe 22b. The air whose pressure has been increased by the air pump 23 flows from the air introducing pipe 22a to the air introducing pipe 22b, and reaches the air distributing pipe 21. The air that has reached the air distributing pipe 21 is distributed to each of the secondary air injection valves 20. Then, the air is injected to the exhaust port 1b from each of the secondary air injection valves 20. The air injected into the exhaust port 1b reacts with unburned fuel in the exhaust gas so as to increase the temperature of the exhaust gas. Using the exhaust gas whose temperature has been increased, the temperature of the three-way catalyst 12 can be increased.

When the rotation of the air pump 23 is stopped and the VSV 26 is closed at the same time, the opening/closing valve 24d is closed so as to stop air flow. In this case, the lead valve 24e prevents the exhaust gas from flowing backward.

The operation state of the air pump 23 is monitored using the output signal from the pressure sensor 27. In the embodiment, the opening/closing of the opening/closing valve 24d is controlled by the VSV 26. However, an electromagnetic valve may be used instead of the VSV 26.

An electronic control unit (hereinafter, referred to as an ECU) 28 for controlling the engine 1 thus configured is provided for the engine 1. The ECU 28 controls the operation state of the engine 1 according to an operation condition of the engine 1 and a driver's request.

Various sensors are connected to the ECU 28 via electric wiring. Output signals from the various sensors are input to the ECU 28. Meanwhile, the fuel injection valves 8, the air pump 23, the VSV 26, and the like are connected to the ECU 28 via the electric wiring so that the ECU 28 can control them. Also, the ECU 28 stores various application programs and various control maps.

For example, in fuel injection valve control, the ECU 28 determines a fuel amount injected from the fuel injection valve 8, and then, determines a time at which the fuel injection valve 8 injects the fuel.

When determining the fuel injection amount, the ECU 28 reads an engine rotational speed and the output signal from the air flow meter 7 (i.e., the intake air amount) that are stored in the ECU 28. The ECU 28 makes access to a fuel injection amount control map, and calculates a basic fuel injection amount (a basic fuel injection period that is a period of time during which fuel injection is performed) according to the engine rotational speed and the intake air amount. The ECU 28 reads an accelerator opening, an intake air temperature, a coolant temperature, and the like using the sensors. Based on the values, the ECU 28 corrects the basic fuel injection period so as to determine a final fuel injection period.

When determining fuel injection timing, the ECU 28 makes access to a fuel injection start timing control map, and calculates a basic fuel injection timing according to the engine rotational speed and the output signal from the air flow meter 7 (i.e., the intake air amount). The ECU 28 reads the accelerator opening, the intake air temperature, the coolant temperature, and the like using the sensors. The ECU 28 corrects the basic fuel injection timing using the values as parameters so as to determine a final fuel injection timing.

After the fuel injection period and the fuel injection timing are determined, the ECU 28 compares the fuel injection timing and the output signal from a crank position sensor (not shown). Then, the ECU 28 starts supply of the driving electric power to the fuel injection valve 8 when the output signal from the crank position sensor matches the fuel injection start timing. Also, the ECU 28 stops the supply of the driving electric power to the fuel injection valve 8 when an elapsed period since the start of the supply of the driving electric power to the fuel injection valve 8 becomes equal to the aforementioned fuel injection period.

When the operation state of the engine 1 is an idling operation state in the fuel injection control, the ECU 28 calculates a target idling rotational speed of the engine 1 using, as parameters, the coolant temperature, the operation states of auxiliaries that are operated using a rotational force of the crankshaft, such as a compressor of an air conditioner for a vehicle compartment, and the like. Then, the ECU 28 performs feedback control of the fuel injection amount such that an actual idling rotational speed matches the target idling rotational speed.

When the secondary air is supplied, the exhaust gas in the oxidizing atmosphere flows through the three-way catalyst 12, and the oxidizing components such as NOx and $O_2$ are adsorbed by the three-way catalyst 12. Accordingly, when the secondary air is supplied, and immediately after the secondary air supply is stopped, the three-way catalyst 12 is in the oxidizing atmosphere. In such an oxidizing atmosphere, a deoxidizing capability of the three-way catalyst 12 is reduced. Therefore, NOx may be emitted into the atmosphere without being purified by the three-way catalyst 12, for example, when the vehicle is accelerated immediately after the secondary air supply is stopped.

Thus, in the embodiment, immediately after the secondary air supply is stopped, the fuel amount injected from the fuel injection valve 8 is increased so that the air-fuel ratio becomes temporarily rich, in order to bring the three-way catalyst 12 out of the excessive oxygen state. While the secondary air is supplied, the fuel amount injected from the fuel injection valve 8 is increased, and the temperature of the exhaust gas is increased so that the temperature of the three-way catalyst 12 is increased quickly. In the embodiment, a stop time at which the increase in the fuel amount is stopped is set to be after a stop time at which the secondary air supply is stopped, whereby the air-fuel ratio is made rich immediately after the secondary air supply is stopped.

Meanwhile, when the fuel amount is increased during the secondary air supply, the temperature of the exhaust gas is increased, which makes it possible to increase the temperature of the three-way catalyst 12 quickly. However, much time is required for the air pump 28 to discharge a rated amount of air after electric power is supplied to the air pump 28. Further, much time is required for air to reach the air distributing pipe 21 from the air introducing pipe 22b through the air introducing pipe 22a, and then to be injected into the exhaust port 1b from each of the secondary air injection valves 20. Accordingly, immediately after the secondary air supply is started, the injection amount of the secondary air is small. Therefore, if the fuel amount is increased at this time, the fuel amount may become excessive, and HC and CO may be emitted into the atmosphere.

Thus, in the embodiment, the arrangement may be such that the fuel amount is not increased during a period from when the secondary air supply is started until when the flow amount of the secondary air becomes sufficient.

Figure 2:
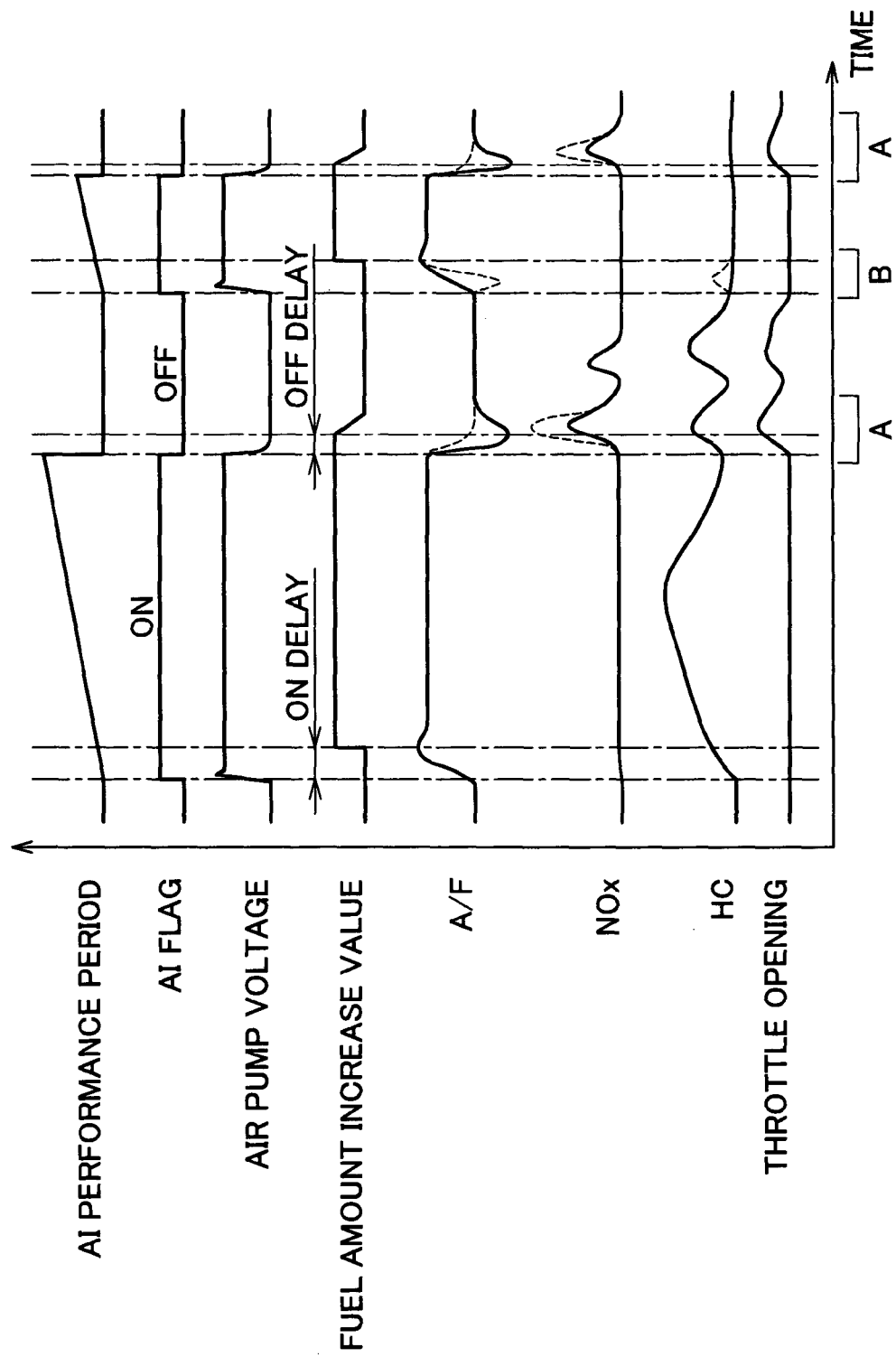
FIG. 2 is a time chart showing time-dependent changes in an air-fuel ratio and the like before and after secondary air supply.

FIG. 2 is a time chart showing time-dependent changes in an air-fuel ratio and the like before and after secondary air supply. In FIG. 2, an AI performance period indicates a period of time during which secondary air supply control (hereinafter, referred to as AI control) is performed. An AI flag is turned ON when the secondary air needs to be supplied. An air pump voltage indicates a voltage supplied to the air pump 23. A fuel amount increase value indicates a fuel amount by which the fuel amount injected from the fuel injection valve 8 in the normal operation state is increased. A/F indicates the air-fuel ratio of the exhaust gas on the upstream side of the three-way catalyst 12. NOx and HC indicate the amount of NOx and HC in the exhaust gas on the downstream side of the three-way catalyst 12. A throttle opening indicates the opening of the throttle valve 5. Also, solid lines indicate values in the case where the AI control is performed, and broken lines indicate values in the case where the AI control is not performed.

When an AI (secondary air supply) performance condition for performing the secondary air supply is satisfied after the engine is started, the AI flag is turned ON, and the AI performance period is counted. The voltage is supplied to the air pump 23 the moment when the AI flag is turned ON. However, much time is required for the rotation of the air pump 23 to be stabilized. During this time, the voltage supplied to the air pump 23 is not stabilized. Meanwhile, the air-fuel ratio on the upstream side of the three-way catalyst 12 gradually increases due to the secondary air supply. When the secondary air supply is stabilized, the fuel amount starts to be increased. A period from when the AI flag is turned ON until when the fuel amount starts to be increased is indicated as "on delay" in FIG. 2. Since the fuel is increased when the engine is started, a large amount of HC flows into the three-way catalyst 12. Further, since the temperature of the three-way catalyst 12 is low, a large amount of HC flows out of the three-way catalyst 12.

Meanwhile, during a period A, when the throttle valve 5 is opened, the AI flag is turned OFF, and counting of the AI performance period is finished. At the same time, the supply of electric power to the air pump 23 is stopped. If the increase in the fuel amount were stopped at this time, the air-fuel ratio on the upstream of the three-way catalyst 12 would be gradually decreased to be approximately the stoichiometric air-fuel ratio, as shown by the broken line. In this case, the three-way catalyst 12 would be in the oxidizing atmosphere, the purification rate of NOx would be low, and the amount of NOx that flows to the downstream side of the three-way catalyst 12 would be large.

Meanwhile, when the stop time at which the increase in the fuel amount stopped is delayed, the air-fuel ratio of the exhaust gas upstream of the three-way catalyst 12 is reduced to be the rich air-fuel ratio. Therefore, the three-way catalyst 12 can be brought out of the oxidizing atmosphere quickly, and the amount of NOx that flows out of the three-way catalyst 12 can be reduced. A period from when the AI flag is turned OFF until when the increase in the fuel amount is stopped is indicated as "off delay" in FIG. 2.

During a period B, if the increase in the fuel amount were started the moment when the AI flag is turned ON, the air-fuel ratio of the exhaust gas upstream of the three-way catalyst 12 would become the rich air-fuel ratio, since the fuel amount would be increased in spite of a small amount of the secondary air. As a result, part of HC would flow to the downstream of the three-way catalyst 12 without being oxidized.

When the start time at which the increase in the fuel amount is started is delayed, the air-fuel ratio upstream of the three-way catalyst 12 does not become lower than the stoichiometric air-fuel ratio. Accordingly, almost no unburned fuel flows to the downstream of the three-way catalyst 12.

Figure 3:
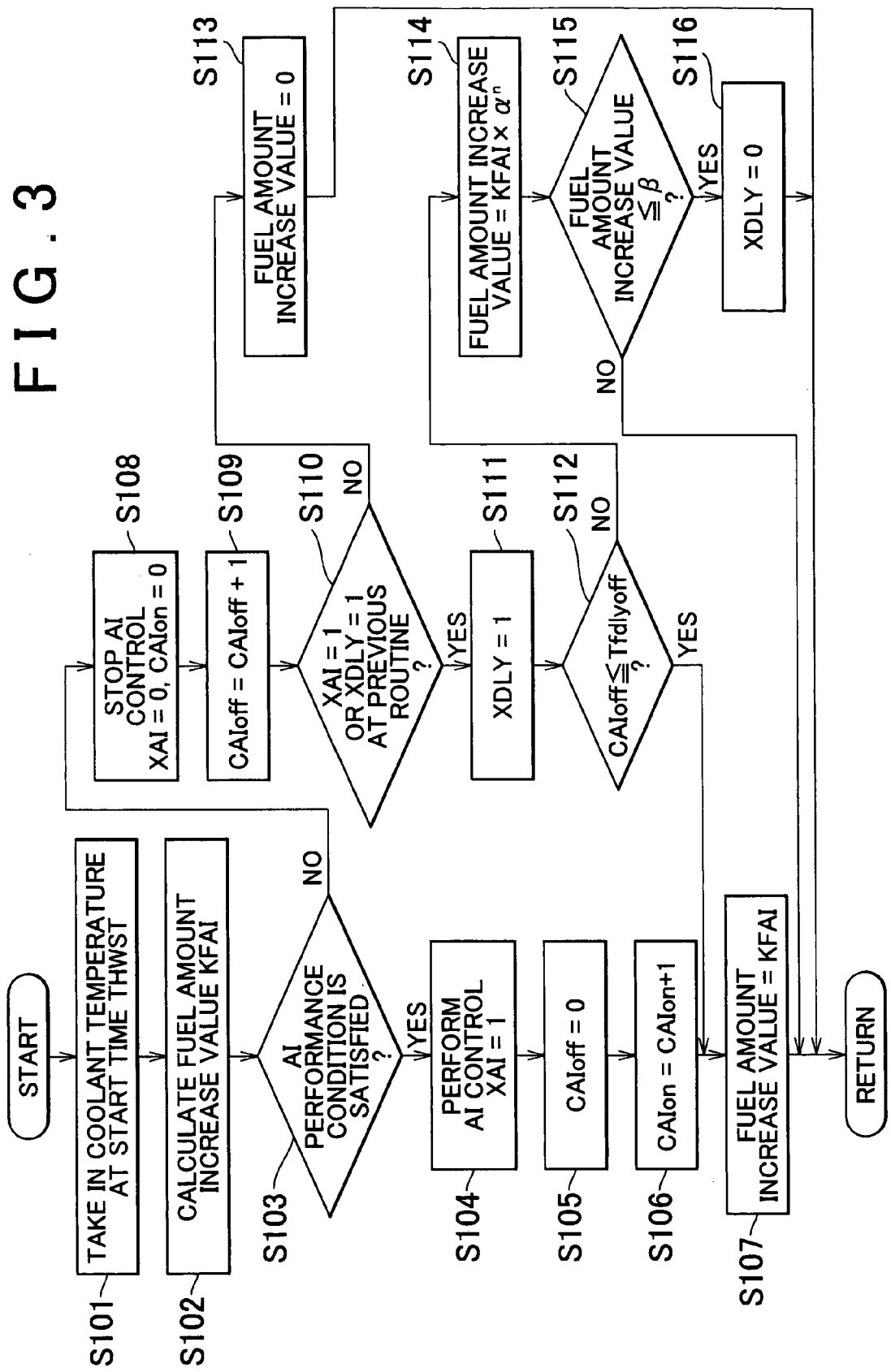
FIG. 3 is a flow chart showing a flow of a process for delaying a time at which an increase in a fuel amount is stopped when the secondary air supply is stopped, according to a first embodiment of the invention.

Subsequently, a secondary air supply control according to the embodiment will be described. FIG. 3 is a flow chart showing a flow of a process for delaying the stop time at which the increase in the fuel amount is stopped when the secondary air supply is stopped, according to the embodiment.

In step S101, the coolant temperature THWST when the engine 1 is started is taken in. The coolant temperature THWST is detected by a coolant sensor (not shown) which is provided in a coolant passage of the engine 1, and which outputs a signal according to the coolant temperature THWST.

In step S102, a fuel amount increase value KFAI is calculated based on the coolant temperature THWST. The fuel amount increase value is a value by which the fuel injection amount is increased when the secondary air is supplied. A relation between the coolant temperature THWST and the fuel amount increase value KFAI is determined through experiments or the like, and a map indicating the relation is made. The map is stored in the ECU 28. The Fuel amount increase value KFAI is calculated based on the detected coolant temperature THWST using the map.

In step S103, it is determined whether or not an AI (secondary air supply) performance condition is satisfied. Examples of the AI performance condition include a condition that a coolant temperature or an intake air temperature is equal to or lower than a predetermined value, a condition that a battery voltage is equal to or higher than a predetermined value, a condition that an accumulated value of the intake air amount detected by the air flow meter 7 while AI is performed is equal to or smaller than a predetermined value, a condition that an engine load is equal to or smaller than a predetermined value, and a condition that a result of a diagnosis on an AI system performed by a failure diagnosis device is normal. When such a condition is satisfied, the secondary air is supplied.

When an affirmative determination is made in step S103, the process proceeds to step S104. Meanwhile, when a negative determination is made in step S103, the process proceeds to step S108. In step S104, the AI control is performed, and the AI performance flag XAI is set to 1 (i.e., the AI performance flag XAI is turned ON). In step S105, an AI off counter CAIoff, which performs counting when the AI performance condition is not satisfied, is cleared.

In step S106, an AI on counter CAIon, which performs counting when the AI performance condition is satisfied, starts counting. In step S107, the fuel injection amount is increased by adding the fuel amount increase value KFAI to the normal fuel injection amount. In step S108, the AI control is stopped, and the AI performance flag XAI is set to 0. Also, the AI on counter CAIon is cleared. In step S109, the AI off counter CAIoff starts counting.

In step S110, it is determined whether or not the value of the AI performance flag XAI after the previous routine is performed is 1 or the value of a flag XDLY after the previous routine is performed is 1. The flag XDLY is 1 during a period in which the fuel amount is gradually decreased when the increase in the fuel amount is stopped.

When an affirmative determination is made in step S110, the process proceeds to step S111. Meanwhile, when a negative determination is made in step S110, the process proceeds to step S118. In step S111, the flag XDLY is set to 1.

In step S112, it is determined whether or not a period counted by the AI off counter CAIoff is equal to or less than a delay period Tfdlyoff. The delay period Tfdlyoff is a period of time from when the secondary air supply is stopped until when the decrease in the fuel amount is started in the case where the increase in the fuel amount is stopped. The delay period Tfdlyoff is determined in advance through experiments or the like.

When an affirmative determination is made in step S112, the process proceeds to step S107. Meanwhile, a negative determination is made in step S112, the process proceeds to step S114. In step S113, the fuel amount increase value KFAI is set to 0.

In step S114, the fuel amount increase value KFAI is newly set to a value obtained by multiplying the fuel amount increase value KFAI by a value $\alpha^n$. In order to suppress fluctuation of the air-fuel ratio due to a sharp decrease in the fuel injection amount when the increase in the fuel amount is stopped, the fuel amount is gradually decreased. The value $\alpha$ is larger than 0 and smaller than 1. The value n is an integral number which is equal to or larger than 1.

In step S115, it is determined whether or not the fuel amount increase value KFAI is equal to or smaller than a predetermined value $\beta$. The predetermined value $\beta$ is set such that fluctuation of the air-fuel ratio is in an allowable range even when the fuel amount increase value is decreased to 0. The predetermined value $\beta$ is determined in advance and is stored in the ECU 28. When an affirmative determination is made in step S115, the process proceeds to step S116. Meanwhile, a negative determination is made, the routine ends.

In step S116, the flag XDLY is set to 0. Thus, it becomes possible to delay the stop time at which the increase in the fuel amount during the secondary air supply is stopped.

In the embodiment, the start time at which the increase in the fuel amount is started may be delayed in consideration of the delay in operation start of the air pump 23.

Figure 4:
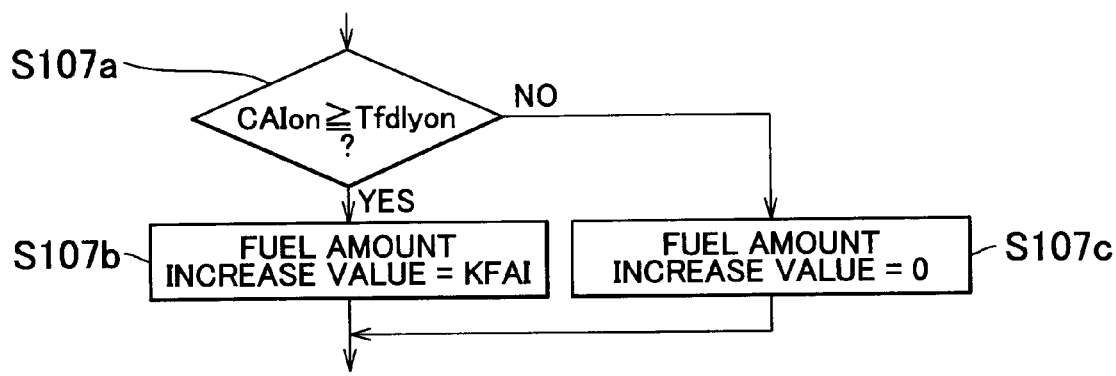
FIG. 4 is a flow chart showing a flow of a process for delaying a time at which the increase in a fuel amount is started.

FIG. 4 is a flow chart showing a flow of a process for delaying a time at which the increase in the fuel amount is started. Step S107 in FIG. 3 can be replaced by a flow shown in FIG. 4.

In step S107a, it is determined whether or not the value of the AI on counter CAIon is equal to or larger than the predetermined value Tfdlyon. The predetermined value Tfdlyon indicates a delay period from when the AI flag is turned ON until when the increase in the fuel amount is started. The predetermined value Tfdlyon is determined in advance through experiments or the like.

When an affirmative determination is made in step S107a, the process proceeds to step S107b. Meanwhile, when a negative determination is made in step S107a, the process proceeds to step S107c. In step S107b, the fuel amount increase value is set to the value KFAI. In step S107c, the fuel amount increase value is set to 0.

Thus, the fuel amount increase value is set to 0, and the start time at which the increase in the fuel amount is started can be delayed from when the secondary air supply is started until when the predetermined period Tfdlyon has elapsed. Thus, it is possible to suppress a decrease in the air-fuel ratio due to the insufficient flow amount of the secondary air as a result of delay in response of the air pump 23 or the like when started.

As described so far, according to the embodiment, by delaying the stop time at which the increase in the fuel amount is stopped, the three-way catalyst 12 can be brought out of the excessive oxygen state when the secondary air supply is stopped, and the amount of NOx discharged from the three-way catalyst 12 can be reduced. Also, by delaying the start time at which the increase in the fuel amount is started, excessive supply of the fuel can be suppressed, and the amount of HC discharged from the three-way catalyst 12 can be reduced.

A second embodiment of the invention is different from the first embodiment of the invention in the following point. In other words, according to the second embodiment, the stop time at which the increase in the fuel amount is stopped can be changed based on the period during which the AI control is performed. The basic configurations of the engine 1 to which the invention is applied and the other hardware are the same as in the first embodiment. Therefore, description thereof will be omitted.

A secondary air supply period during which the secondary air is supplied is correlated with the amount of the oxidizing components adsorbed by the three-way catalyst. As the secondary air supply period is longer, the amount of the oxidizing components adsorbed by the three-way catalyst is larger. Accordingly, as the secondary air supply period is longer, the delay period Taioffdly is set to be longer. This relation is determined in advance through experiments or the like, and a map indicating the relation is made. The map is stored in the ECU 28.

Subsequently, secondary air supply control according to the embodiment will be described.

Figure 5:
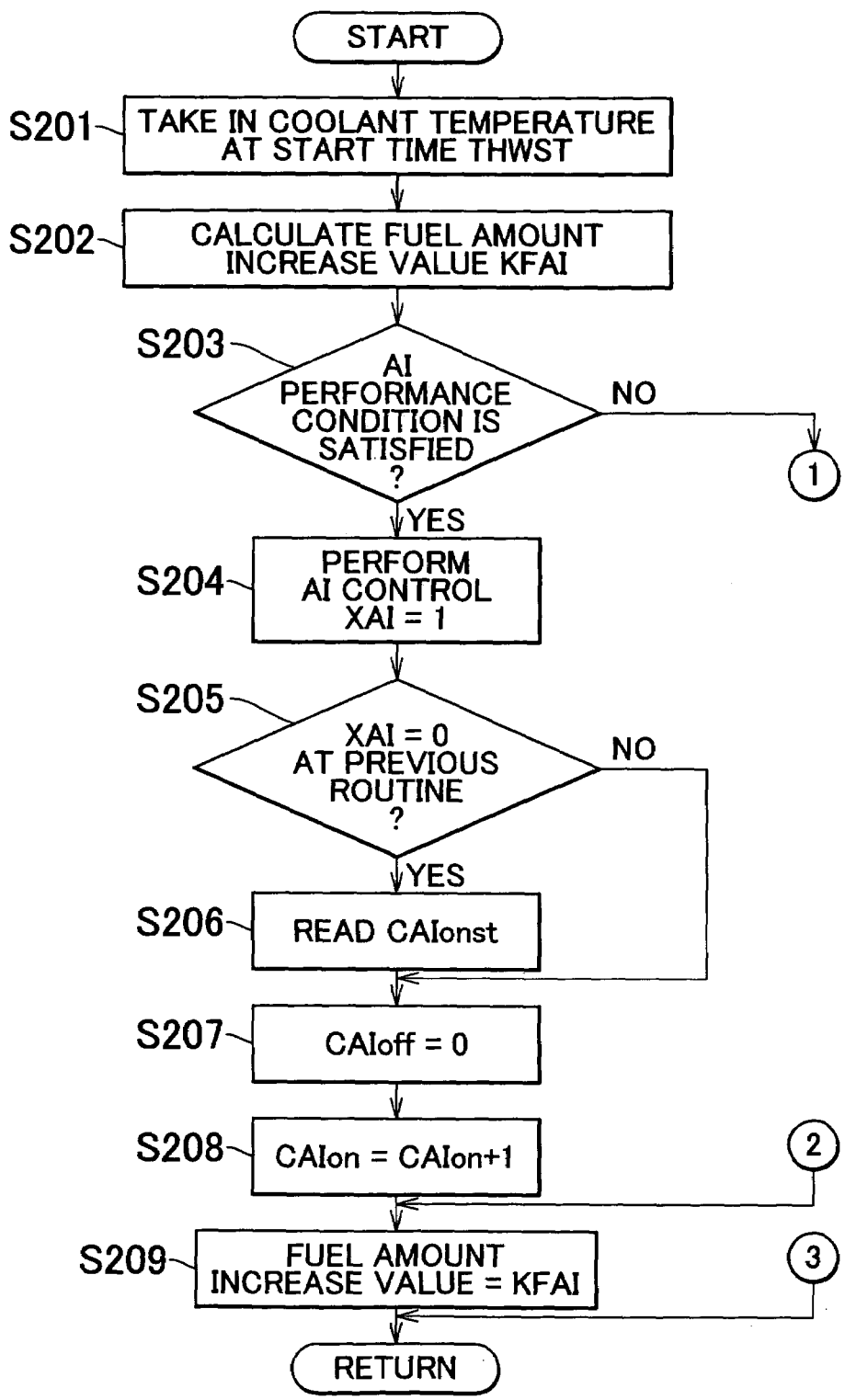
FIG. 5 is a flow chart showing a flow of secondary air supply control according to a second embodiment of the invention.
Figure 6:
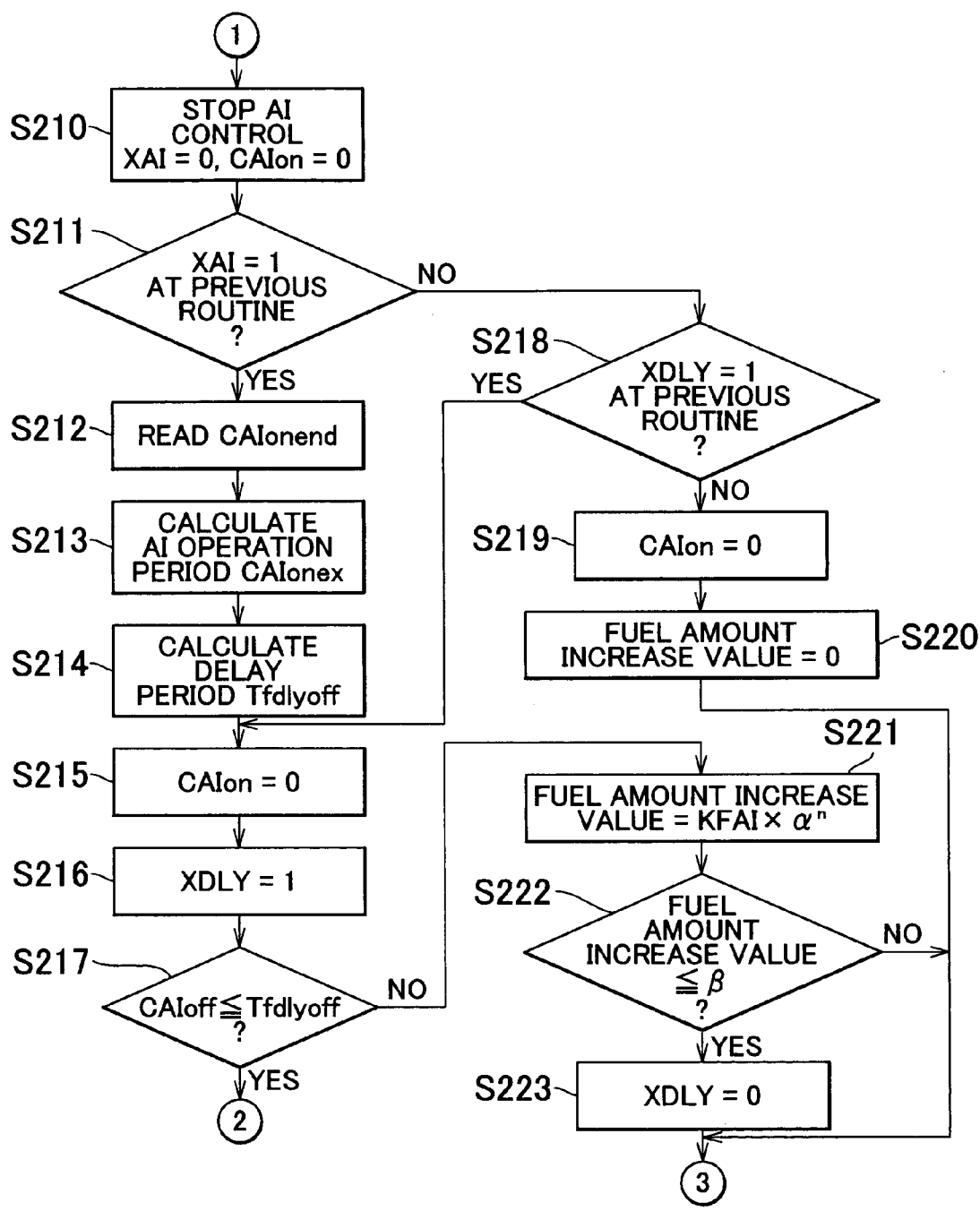
FIG. 6 is a flow chart showing a flow of secondary air supply control according to the second embodiment of the invention.

Each of FIG. 5 and FIG. 6 is a flow chart showing secondary air supply control according to the embodiment. Numerals 1, 2, and 3 in FIG. 5 correspond to reference numerals 1, 2, and 3 in FIG. 6, respectively.

In steps S201 to S204, the same processes as in steps S101 to S104 in FIG. 3 are performed. In step S205, it is determined whether the value of the AI performance flag XAI at the time of the previous routine is 0. When an affirmative determination is made in step S205, the process proceeds to step S206. Meanwhile, a negative determination is made in step S205, the process proceeds to step S207.

In step S206, a counter value CAIonst at a start time of the AI operation is read. In steps S207 to S 209, the same processes as in steps S105 to S 107 in FIG. 3 are performed. In step S210, the same processes as in step S108 in FIG. 3 are performed.

In step S211, it is determined whether or not the value of the AI performance flag XAI at the previous routine is 1. When an affirmative determination is made in step S211, the process proceeds to step S212. Meanwhile, when a negative determination is made in step S211, the process proceeds to step S218.

In step S212, a counter value CAIonend at a finish time of the AI operation is read. In step S213, an AI operation period CAIonex is calculated. The AI operation period CAIonex is determined by subtracting the counter value CAIonst at the start time of the AI operation from the counter value CAIonend at the finish time of the AI operation.

In step S214, the delay period Tfdlyoff is calculated. The relation between the AI operation period CAIonex and the delay period Tfdlyoff is determined in advance through experiments or the like, and a map indicating the relation is made. The map is stored in the ECU 28. The delay period Tfdlyoff is calculated based on the AI operation period CAIonex using the map.

In step S215, the AI on counter CAIon, which performs counting when the AI performance condition is satisfied, is cleared. In step S216, the flag XDLY is set to 1.

In step S217, it is determined whether or not the value of the AI off counter CAIoff is equal to or smaller than the value of the delay period Tfdlyoff. The delay period Tfdlyoff is a period of time from when the secondary air supply is stopped until when the increase in the fuel amount is stopped. The delay period Tfdlyoff has been calculated in step S214.

When an affirmative determination is made in step S217, the process proceeds to step S209. Meanwhile, a negative determination is made in step S217, the process proceeds to step S221. In step S218, it is determined whether or not the value of the flag XDLY at the previous routine is 1.

When an affirmative determination is made in step S218, the process proceeds to step S215. Meanwhile, when a negative determination is made in step S218, the process proceeds to step S219. In step S219, the AI on counter CAIon, which performs counting when the AI performance condition is satisfied, is cleared. In steps S220 to S 223, the same processes as in steps S113 to S116 in FIG. 3 are performed.

Thus, the stop time at which the increase in the fuel amount is stopped can be changed according to the secondary air supply period.

In the embodiment, the stop time at which the increase in the fuel amount is stopped may be changed based on a total amount of new air inhaled into the engine 1 during the secondary air supply (i.e., an accumulated air amount), instead of the secondary air supply period.

Figure 7:
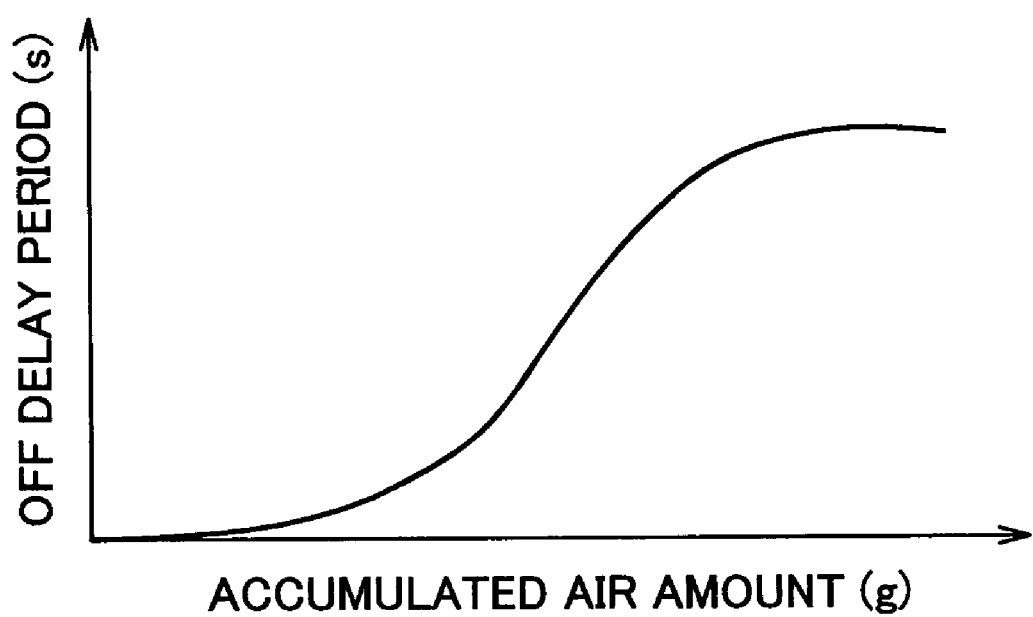
FIG. 7 is a diagram showing a relation between an accumulated air amount and a delay period.

FIG. 7 is a diagram showing a relation between the accumulated air amount and the delay period. The amount of new air inhaled into the engine 1 during the secondary air supply (i.e., the intake new air amount) is correlated with the amount of the oxidizing components adsorbed by the three-way catalyst 12. As the intake new air amount is larger, the amount of the oxidizing components adsorbed by the three-way catalyst 12 is larger. Accordingly, as the intake new air amount is larger, the delay period Tfdlyoff is set to be longer.

Subsequently, secondary air supply control in which the stop time at which the increase in the fuel amount is stopped can be changed based on the accumulated air amount will be described. The steps which are different from the steps in the flow chart in FIG. 5 and FIG. 6 will be described.

In step S206, a total intake air amount (an accumulated air amount) GAsumst at the start time of the AI operation is read, instead of the counter value CAIonst at the start time of the AI operation. The amount of new air inhaled into the engine 1 per unit time (the intake air amount) is determined based on the output signal from the air flow meter 7. By accumulating this value, the ECU 28 calculates the accumulated air amount.

In step S212, an accumulated air amount GAsumend at the finish time of the AI operation is read, instead of the counter value CAIonend at the finish time of the AI operation. In step S213, an accumulated air amount GAsumex during the AI operation is calculated, instead of the AI operation period CAIonex. The accumulated air amount GAsumex during the AI operation is determined by subtracting the accumulated air amount GAsumst at the start time of the AI operation from the accumulated air amount GAsumend at the finish time of the AI operation.

In step S214, the delay period Tfdlyoff is calculated. The delay period Tfdlyoff is calculated based on the accumulated air amount GAsumex during the AI operation using the map shown in FIG. 7.

Thus, the stop time at which the increase in the fuel amount is stopped can be changed according to the air amount inhaled into the engine 1 during the secondary air supply.

Also, in the embodiment, the stop time at which the increase in the fuel amount is stopped can be changed based on a temperature increase amount by which the temperature of the three-way catalyst 12 is increased during the secondary air supply, instead of the secondary air supply period, or the accumulated air amount during the secondary air supply.

The temperature increase amount by which the temperature of the three-way catalyst 12 is increased during the secondary air supply is correlated with the amount of the oxidizing components adsorbed by the three-way catalyst 12. In other words, as the supply amount of the secondary air is larger, the amount of the oxidizing components adsorbed by the three-way catalyst 12 is larger, and the temperature increase amount by which the bed temperature of the three-way catalyst 12 is increased is larger.

Accordingly, as the temperature increase amount by which the temperature of the three-way catalyst 12 has been increased when the secondary air supply is stopped is larger, the delay period Taioffdly is set to be longer. This relation is determined in advance through experiments or the like, and a map indicating the relation is made. The map is stored in the ECU 28. The bed temperature of the three-way catalyst 12 can be detected by providing a temperature sensor in the three-way catalyst 12. The ECU 28 calculates the temperature increase amount during the secondary air supply by detecting the temperature of the three-way catalyst 12 at the start time and the stop time of the secondary air supply.

Thus, the stop time at which the increase in the fuel amount is stopped can be changed according to the temperature increase amount by which the temperature of the three-way catalyst 12 is increased during the secondary air supply.

In the embodiment, as in the first embodiment, the start time at which the increase in the fuel amount is started may be delayed in consideration of the delay in the operation start of the air pump 23.

As described so far, according to the embodiment, the stop time at which the increase in the fuel amount is stopped can be changed based on the secondary air supply period, the accumulated air amount during the secondary air supply, or the temperature increase amount by which the temperature of the three-way catalyst is increased during the secondary air supply. Accordingly, HC can be supplied according to the amount of the oxidizing components adsorbed by the three-way catalyst 12, and the three-way catalyst 12 can be brought out of the oxidizing atmosphere. Thus, deterioration of the exhaust emission can be suppressed.

What is claimed is:

1. A secondary air supply system comprising:
   an exhaust gas control catalyst which is provided in an exhaust system in an internal combustion engine, and which purifies a harmful component in exhaust gas;
   a secondary air supply device which supplies secondary air into the exhaust gas upstream of the exhaust gas control catalyst;
   a secondary air supply stop device which stops the secondary air supply performed by the secondary air supply device;
   a fuel supply device which supplies fuel to the internal combustion engine;
   a fuel amount increasing device which increases a fuel amount supplied to the internal combustion engine when the secondary air supply device supplies the secondary air; and
   a fuel amount increase stop time delaying device which delays, by a predetermined delay period, a stop time at which the increase in the fuel amount caused by the fuel amount increasing device is stopped even when the secondary air supply is stopped by the secondary air supply stop device.

2. The secondary air supply system according to claim 1, further comprising:
   a fuel amount increase start time delaying device which delays a start time at which the increase in the fuel amount is started, wherein the increase in the fuel amount caused by the fuel amount increasing device is prohibited during a period from when an operation of the secondary air supply device is started until when it becomes possible to supply a predetermined amount of the secondary air.

3. The secondary air supply system according to claim 1, further comprising:
   a secondary air supply period calculating device which calculates a secondary air supply period during which the secondary air is supplied, wherein the fuel amount increase stop time delaying device delays, by a longer delay period, the stop time at which the increase in the fuel amount is stopped after the secondary air supply is stopped as the secondary air supply period calculated by the secondary air supply period calculating device is longer.

4. The secondary air supply system according to claim 1, further comprising:
   an intake air amount calculating device which calculates an intake air amount that is an amount of air inhaled into the internal combustion engine during the secondary air supply, wherein the fuel amount increase stop time delaying device which delays, by a longer delay period, the stop time at which the increase in the fuel amount is stopped after the secondary air supply is stopped, as the intake air amount calculated by the intake air amount calculating device is larger.

5. The secondary air supply system according to claim 1 further comprising:
   a catalyst temperature detecting device which detects a temperature of the exhaust gas control catalyst, wherein the fuel amount increase stop time delaying device delays, by a longer delay period, the stop time at which the increase in the fuel amount is stopped after the secondary air supply is stopped as a temperature increase amount by which the temperature of the exhaust gas control catalyst is increased during the secondary air supply is larger.

6. A secondary air supply system comprising:
   an exhaust gas control catalyst which is provided in an exhaust system in an internal combustion engine, and which purifies a harmful component in exhaust gas;
   secondary air supply means for supplying secondary air into the exhaust gas upstream of the exhaust gas control catalyst;
   secondary air supply stop means for stopping the secondary air supply performed by the secondary air supply means;
   fuel supply means for supplying fuel to the internal combustion engine;
   fuel amount increasing means for increasing a fuel amount supplied to the internal combustion engine when the secondary air supply means supplies the secondary air; and
   fuel amount increase stop time delaying means for delaying, by a predetermined delay period, a stop time at which the increase in the fuel amount caused by the fuel amount increasing means is stopped even when the secondary air supply is stopped by the secondary air supply stop means.

7. A secondary air supply method comprising the steps of:
   purifying a harmful component in exhaust gas using an exhaust gas control catalyst provided in an exhaust system of an internal combustion engine;
   supplying secondary air into the exhaust gas upstream of the exhaust gas control catalyst;
   stopping the secondary air supply;
   supplying fuel to the internal combustion engine;
   increasing a fuel amount supplied to the internal combustion engine when the secondary air is supplied; and
   delaying, by a predetermined delay period, a stop time at which the increase in the fuel amount is stopped even when the secondary air supply is stopped.

8. The secondary air supply method according to claim 7, further comprising the step of:
   prohibiting the increase in the fuel amount during a period from when the secondary air supply is started until when it becomes possible to supply a predetermined amount of the secondary air.

9. The secondary air supply method according to claim 7, further comprising the step of:
   calculating a secondary air supply period during which the secondary air is supplied, wherein as the secondary air supply period is longer, the stop time at which the increase in the fuel amount is stopped is delayed by a longer delay period after the secondary air supply is stopped.

10. The secondary air supply method according to claim 7, further comprising the step of:
    calculating an intake air amount that is an amount of air inhaled into the internal combustion engine during the secondary air supply, wherein as the intake air amount during the secondary air supply is larger, the stop time at which the increase in the fuel amount is stopped is delayed by a longer delay period after the secondary air supply is stopped.

11. The secondary air supply method according to claim 7, further comprising the step of:
    detecting a temperature of the exhaust gas control catalyst, wherein as a temperature increase amount by which the temperature of the exhaust gas control catalyst is increased is larger, the stop time at which the increase in the fuel amount is stopped is delayed by a longer delay period after the secondary air supply is stopped.

* * * * *